(12) United States Patent
Hall et al.

(10) Patent No.: US 7,615,149 B2
(45) Date of Patent: Nov. 10, 2009

(54) AGITATOR IN A SEWER SYSTEM

(76) Inventors: David R. Hall, 2185 S. Larsen Pkwy., Provo, UT (US) 84606; Tyson Wilde, 2185 S. Larsen Pkwy., Provo, UT (US) 84606; Benjamin Hillyard, 2185 S. Larsen Pkwy., Provo, UT (US) 84606

(*) Notice: Subject to any disclaimer, the term of this patent is extended or adjusted under 35 U.S.C. 154(b) by 24 days.

(21) Appl. No.: 12/051,135

(22) Filed: Mar. 19, 2008

(65) Prior Publication Data

US 2009/0236274 A1 Sep. 24, 2009

(51) Int. Cl.
*C02F 3/28* (2006.01)
*B02C 19/00* (2006.01)

(52) U.S. Cl. ............... 210/170.08; 210/173; 210/257.1; 210/532.2; 241/46.06; 241/46.13

(58) Field of Classification Search ............ 210/170.01, 210/170.08, 173, 257.1, 258, 259, 532.2; 241/46.01, 46.012, 46.013, 46.06, 46.13
See application file for complete search history.

(56) References Cited

U.S. PATENT DOCUMENTS

| | | | | |
|---|---|---|---|---|
| 1,120,351 | A * | 12/1914 | Weston | 210/532.2 |
| 1,529,019 | A * | 3/1925 | Evans | 210/532.2 |
| 1,616,394 | A * | 2/1927 | Schiding | 210/532.2 |
| 2,795,193 | A | 6/1957 | Linscott | |
| 2,848,172 | A * | 8/1958 | Ewing | 241/46.01 |
| 2,974,800 | A * | 3/1961 | Fleischmann | 210/173 |
| 3,439,361 | A * | 4/1969 | Moore | 241/46.01 |
| 3,824,632 | A * | 7/1974 | Bach et al. | 210/173 |
| 4,318,670 | A | 3/1982 | Fechter | |
| 4,448,359 | A * | 5/1984 | Meyers | 241/46.06 |
| 4,534,388 | A * | 8/1985 | Pall et al. | 241/46.06 |
| 4,812,237 | A * | 3/1989 | Cawley et al. | 210/631 |
| 4,830,585 | A | 5/1989 | Ruyle | |
| 5,114,586 | A * | 5/1992 | Humphrey | 210/259 |
| 6,112,338 | A | 9/2000 | Sundberg | |
| 6,365,047 | B1 * | 4/2002 | Bischof et al. | 210/173 |
| 2003/0010693 | A1 * | 1/2003 | Yamada et al. | 210/173 |

\* cited by examiner

*Primary Examiner*—Christopher Upton
(74) *Attorney, Agent, or Firm*—Tyson J. Wilde (57) ABSTRACT

In one aspect of the invention, a sewer system has a waste material flow path which has an entrance and a downstream digester assembly. At least one in-line agitator is disposed upstream to the digester assembly. The at least one in-line agitator adapted to break down the waste material.

13 Claims, 8 Drawing Sheets

AGITATOR IN A SEWER SYSTEM

BACKGROUND OF THE INVENTION

The current invention relates to sewer systems. Waste from the sewers is often collected in a septic tank where it is stored until it is emptied. In some cases the emptied waste is dumped in rivers, lakes, and/or the natural environment. In other cases the waste is recycled and reused as fertilizers or used for other purposes.

U.S. Pat. No. 2,709,680 to Watson, which is herein incorporated by reference for all that it contains discloses a process and apparatus for the treatment and/or disposal of sewage of lake or seagoing vessels.

U.S. Pat. No. 6,299,774 to Ainsworth, which is herein incorporated by reference for all that it contains discloses a process to recover energy, reduce pollution potential, and add value to organic waste such as animal manure. The process involves the anaerobic digestion of feedstocks, such as animal manure, at low to high temperatures in batch, semi-continuous or continuous reactors. The process makes use of existing handling and storage equipment at the farm and requires minimal supervision and skill by the operator.

U.S. Pat. No. 4,318,993 to Ghosh, which is herein incorporated by reference for all that it contains discloses a two phase anaerobic digestion process in which an initial phase continually receives an organic feed for short detention times of less than two days under conditions which efficiently liquefy and breakdown the feed to lower molecular weight acids and other intermediates for conversion to methane. A succeeding phase is operated to treat the lower molecular weight acids and intermediates for detention times of about two to about seven days under conditions which efficiently lead to production of methane. The feed is loaded in the first phase at rates from about one to about ten pounds of total organics per cubic foot per day; and the products from the initial phase are loaded in the succeeding phase at rates of about 0.1 to about 0.5 pounds total organics per cubic foot per day.

BRIEF SUMMARY OF THE INVENTION

In one aspect of the invention, a sewer system has a waste material flow path which is made of an entrance and a downstream digester assembly. At least one in-line agitator is disposed upstream to the digester assembly. The at least one in-line agitator is adapted to break down the waste material.

The digester assembly may comprise a first and second tank. A least one of the tanks may be adapted to process waste material through an anaerobic digestion process. The first tank may be adapted to temporarily store the waste material. The digester may comprise a connection adapted to provide fluid communication between the first tank and second tank. The first tank may comprise a settling pool. The digester assembly may be an anaerobic digester assembly.

A pump may be positioned upstream from the at least one agitator. The at least one in-line agitator may be a micronizer. The micronizer may comprise a first cylinder with a substantially flat polycrystalline diamond bonded to a face. The first cylinder may comprise a substantially circular port disposed concentrically with its center. The micronizer may comprise a second cylinder with a substantially flat polycrystalline diamond bonded to a face. The first cylinder may be disposed proximate the second cylinder such that when the first cylinder is in contact with the second cylinder, the polycrystalline diamond of the first cylinder contacts the polycrystalline diamond of the second cylinder. The micronizer may comprise a biasing unit.

The entrance of the sewer system may be in fluid communication with a toilet, sink, washing machine, dishwasher, drain, wastewater receptacle or combinations thereof. The in-line agitator may be an auger in a pipe comprising at least one plate disposed intermediate two side by side blades. The at least one in-line agitator may comprise a rotor. The at least one in-line agitator may comprise a crusher. The at least one in-line agitator may comprise a spinning thrower. The at least one in-line agitator may comprise a funnel. The at least one in-line agitator may comprise at least one blade.

DETAILED DESCRIPTION OF THE INVENTION AND THE PREFERRED EMBODIMENT

Figure 1:
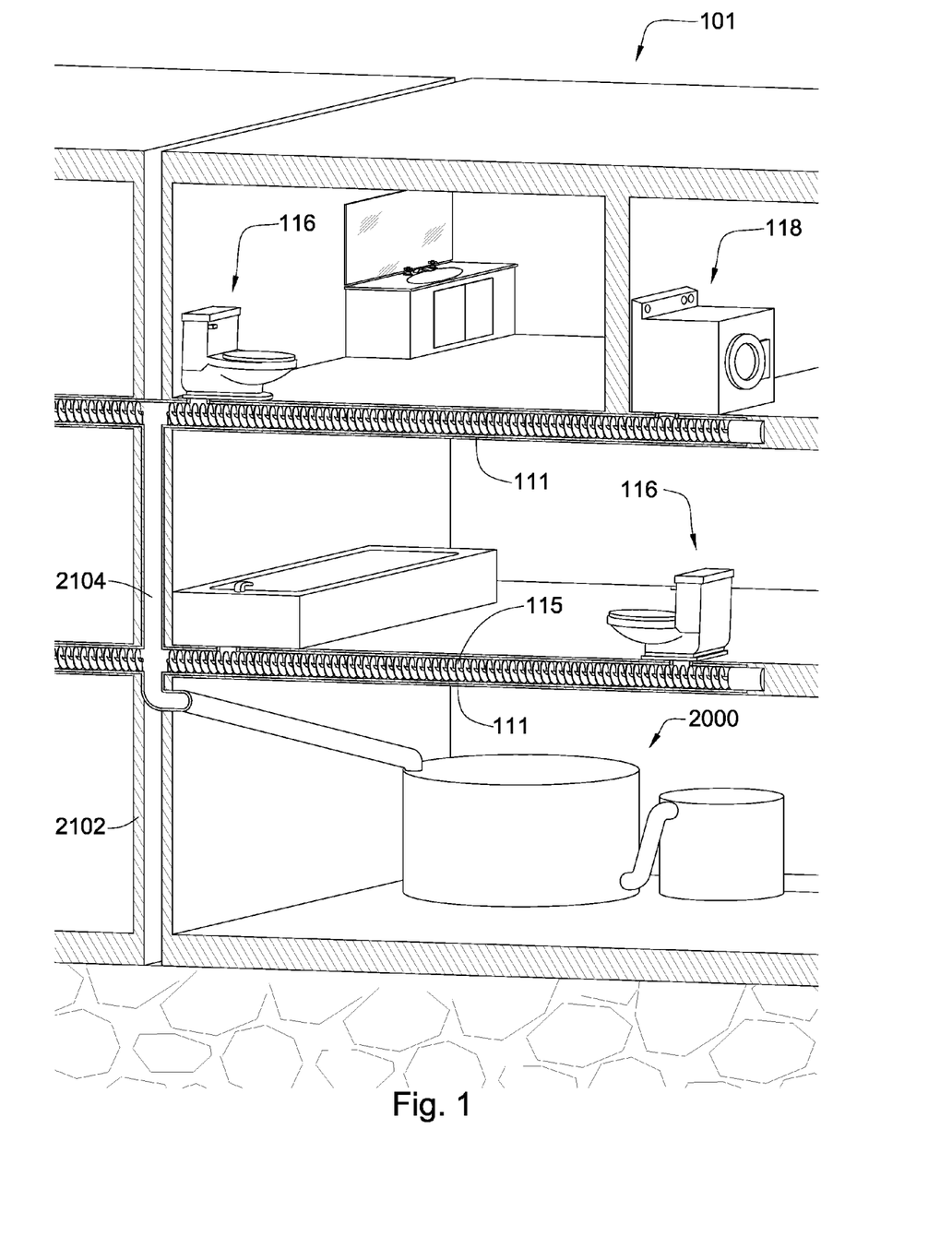
FIG. 1 is a cross-sectional diagram of an embodiment of a sewer system.

FIG. 1 is a cross-sectional diagram of an embodiment of a sewer system. A building 101 may be equipped with substantially horizontal pipes disposed within the floors and or ceilings and is in fluid communication with toilets 116, tubs, washing machines 118, dishwashers, sinks and other facilities that expel waste into the sewer system. An auger 115 in the horizontal pipes 111 may move sewage in a generally horizontal fashion within the floor from one end of the pipe to another end, where it is dumped into shared pipes 2104 located is a utility space 2102 between the buildings which direct the sewage to a digester assembly 2000. In some embodiments, the waste is moved by gravity through slopes incorporated in the sewer system. In the preferred embodiment, the digester assembly 2000 is an anaerobic digester assembly. The digester assembly 2000 uses micro-organisms to break down the sewage and turn it into CO2, methane, and soil nutrients. Preferably the products of the digester assembly are re-used in the vicinity of the buildings such as in gardens or powering machines and vehicles.

Figure 2:
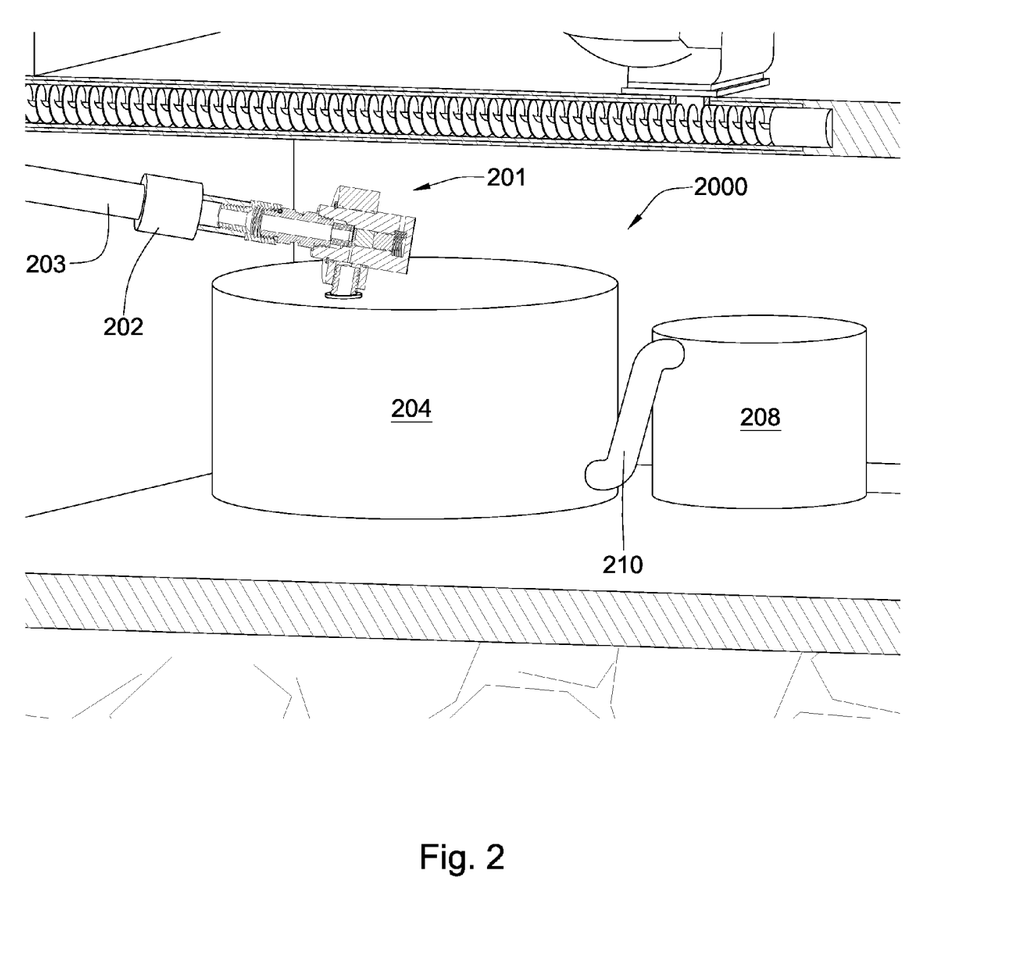
FIG. 2 is a perspective diagram of an embodiment of an in-line agitator in a sewer line.

FIG. 2 is a perspective diagram of an embodiment of an in-line agitator 201 and a pump 202 in a sewer line 203. The pump 202 may be disposed upstream to the in-line agitator 201. The pump 202 may be adapted to move the waste material through the in-line agitator 201. In some embodiments, the pump may be used only when needed such as cases where the agitator is clogged or if there insufficient pressure to move the waste through the agitator. In some embodiments, the in-line agitator is positioned within a vertical portion of the sewer system to employ gravity to move the waste through. In other embodiments, the pump is part of a closed loop system or in communication with sensors elsewhere in the sewer system which provide data used to determine when and how long to turn the pump on.

The in-line agitator 201 is adapted to break down the waste material it passes through. The broken down material that was passed through the in-line agitator 201 may be collected in a first tank 204 in the digester assembly 2000. The first tank 204 may be adapted to store the waste material. A settling pool within the first tank 204 may be adapted to separate the waste material constituents. For example solid waste may sink to the bottom of the tank while water settles over it. The water may be pumped out and treated in a separate processor. The second tank 208 may be adapted to carry out the anaerobic digestion process using micro-organisms. The digester assembly 2000 uses micro-organisms to break down the waste material and turn it into $CO_2$, methane, and soil nutrients. A connection 210 intermediate the first tank 204 and a second tank 208 may provide fluid communication between the tanks.

The agitators may provide the advantage of reducing the waste size and thereby reduce the time duration of the digestion process. Preferably, all of the waste is digested on the same day that it is received.

Figure 3:
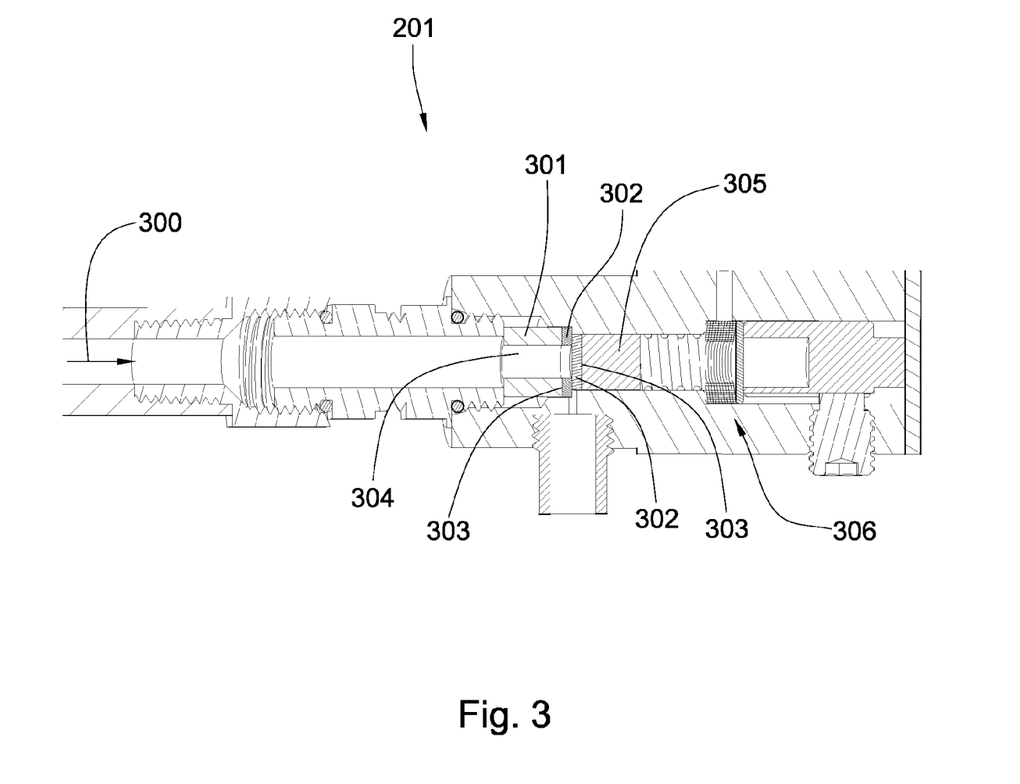
FIG. 3 is a cross-sectional diagram of an embodiment of an in-line agitator.

FIG. 3 is a cross-sectional diagram of an embodiment of an in-line agitator 201. Waste material flows in the direction of the arrow 300 towards a first cylinder 301 with a substantially flat polycrystalline diamond 302 bonded to a face 303. The first cylinder 301 may comprise a substantially circular port 304 allowing the waste material to flow through the first cylinder 301. The in-line agitator 201 may also comprise a second biased cylinder 305 with a substantially flat polycrystalline diamond 302 bonded to a face 303. As the waste material flows through the first cylinder 301 it pushes against the second cylinder 305 causing it to vibrate. The vibration may be caused by a biasing unit 306 such as a spring. As the two cylinders move with respect to each other the waste may be crushed between them and thereby reduce the waste's size. In some embodiments, the cylinders may be made of carbide, steel, ceramics, and combinations thereof. In some embodiments, diamond is not used.

Figure 4:
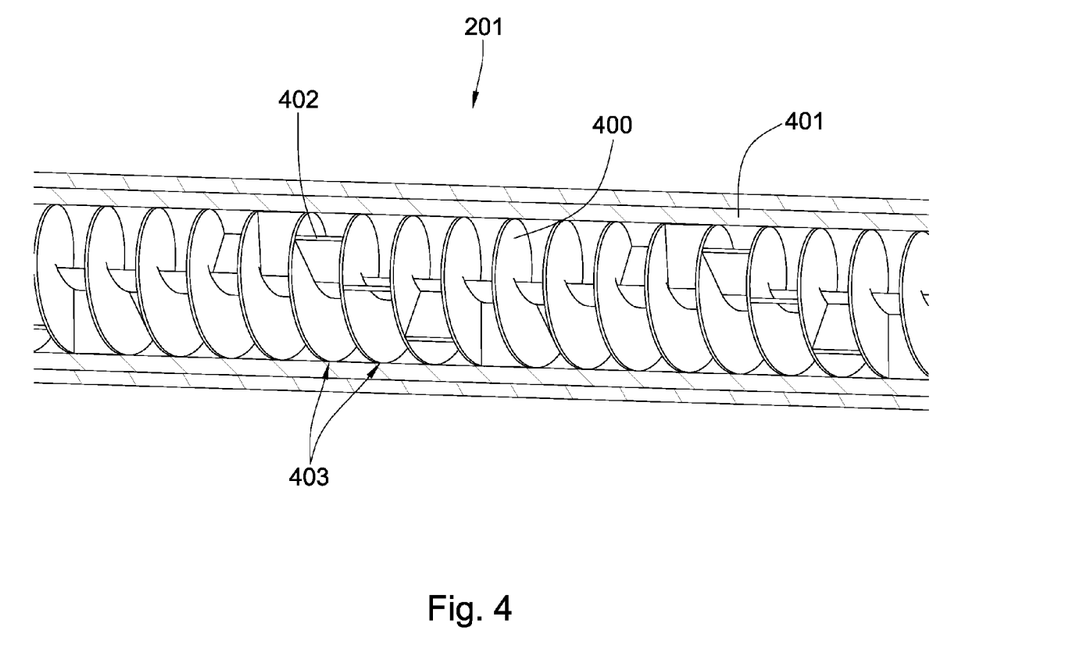
FIG. 4 is a cross-sectional diagram of another embodiment of an in-line agitator.

FIG. 4 is a cross-sectional diagram of another embodiment of an in-line agitator 201. An auger 400 is disposed within a pipe 401 leading to a digester assembly 2000 (shown in FIG. 2). The auger 400 may comprise a plurality of plates 402, at least one of which may be disposed intermediate two blades 403. As the auger 400 rotates, the waste material is moved along the pipe 401. In one full revolution of the auger 400, a plate 402 picks up the waste material from the bottom of the pipe and rotates it until the plate reaches a vertical position at which point the waste material falls from the plate back to the bottom of the pipe 401.

Figure 5:
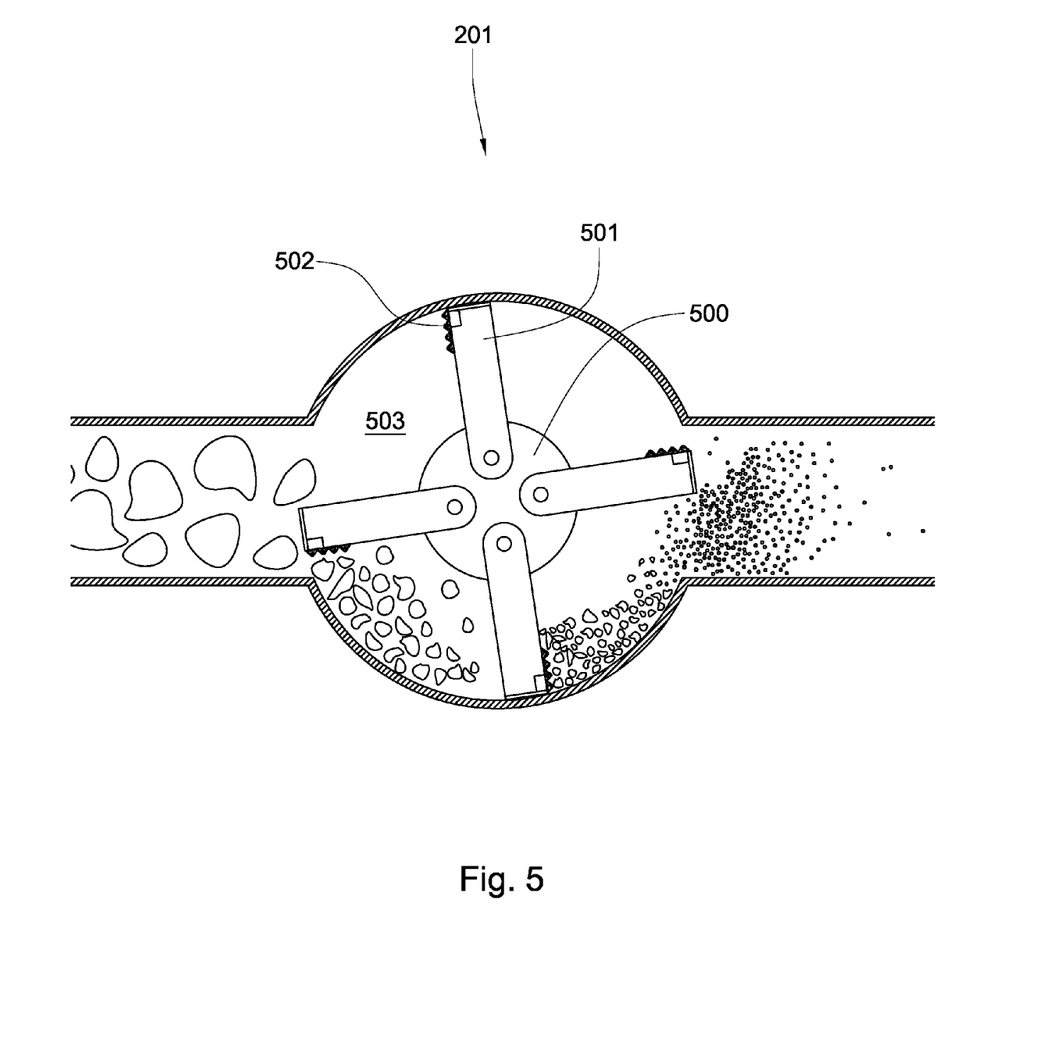
FIG. 5 is a cross-sectional diagram of another embodiment of an in-line agitator.

FIG. 5 is a cross-sectional diagram of another embodiment of an in-line agitator 201. The in-line agitator 201 may comprise a rotor 500. The rotor 500 may comprise a plurality of arms 501 radially mounted to the rotor 500. The arms 501 may comprise hard tips 502 adapted for crushing the waste material as it passes into the crushing chamber 503. In some embodiments, the rotor is driven by a motor and in other embodiments, the rotor is driven by the flow of waste material.

Figure 6:
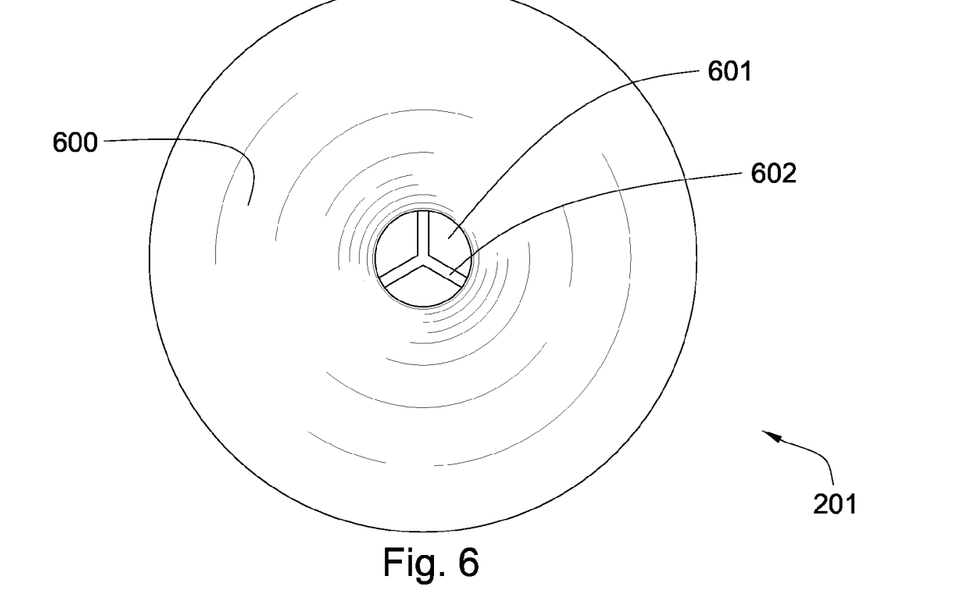
FIG. 6 is a cross-sectional diagram of another embodiment of an in-line agitator.

FIG. 6 is a cross-sectional diagram of another embodiment of an in-line agitator 201. The in-line agitator 201 may comprise a funnel 600 adapted to concentrate the flow of the waste material into the thrower 601. The thrower 601 may comprise a plurality of vertical plates 602 adapted to hurl the waste material against a plurality of plates 605 (shown in FIG. 6b) disposed radially around the wall of the pipe 111 (shown in FIG. 7) causing it to break up.

Figure 7:
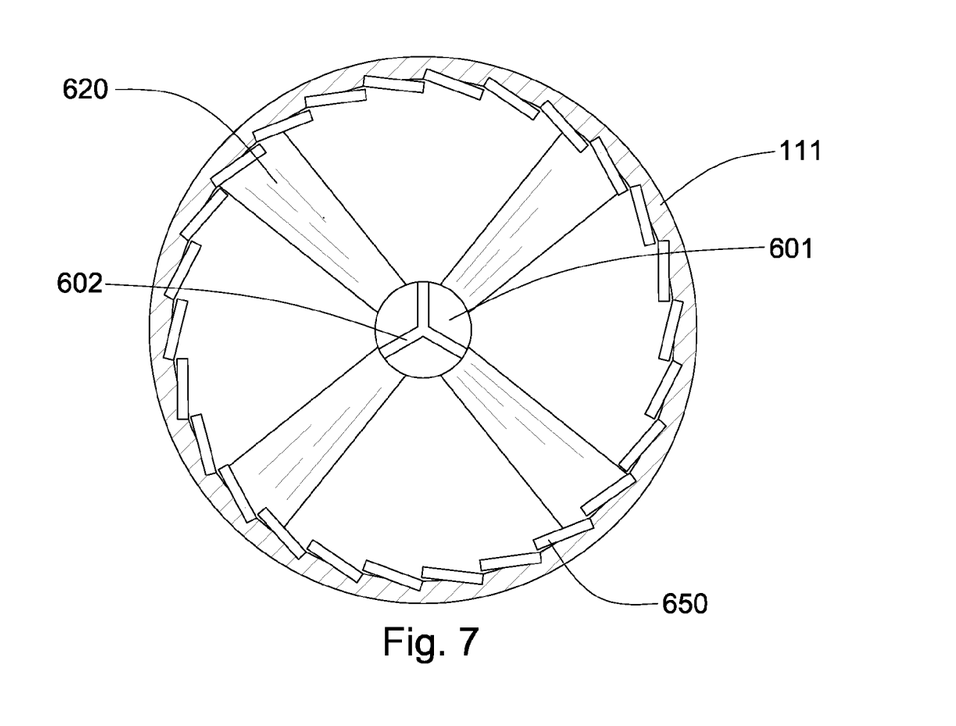
FIG. 7 is a cross-sectional diagram of another embodiment of an in-line agitator.

FIG. 7 is a cross-sectional diagram of another embodiment of an in-line agitator 201. The in-line agitator 201 may comprise a thrower 601 disposed substantially concentric with the axis of the pipe 111. The thrower 601 may comprise a plurality of vertical plates 602 adapted to hurl the waste material against a plurality of plates 650 disposed radially around the wall of the pipe 111 causing it to break up. The thrower 601 may generally be held stationary by at least one support 620 arranged radially around the thrower 601.

Figure 8:
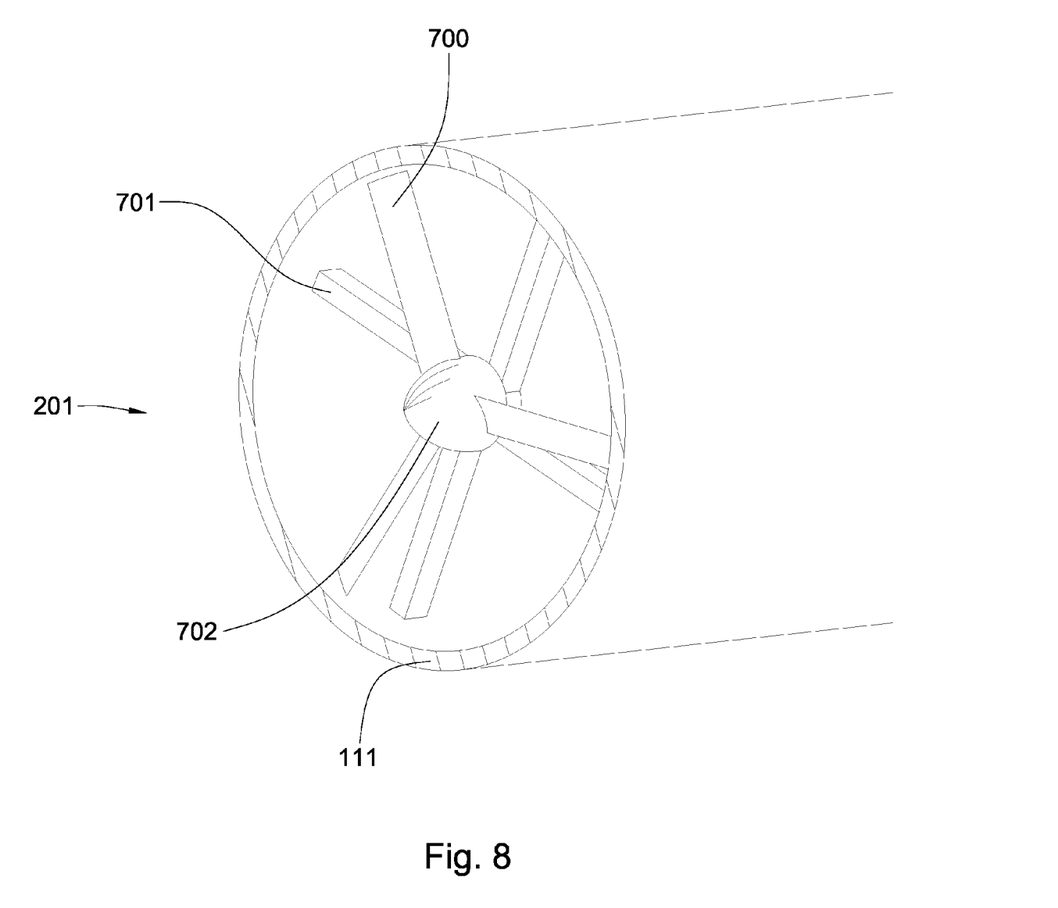
FIG. 8 is a cross-sectional diagram of another embodiment of an in-line agitator.

FIG. 8 is a cross-sectional diagram of another embodiment of an in-line agitator 201. The in-line agitator 201 may comprise at least one rotor blade 700 mounted on a rotor 702. The rotor 702 may be mounted concentrically with the center of the pipe 111 with at least one support beam 701.

Figure 9:
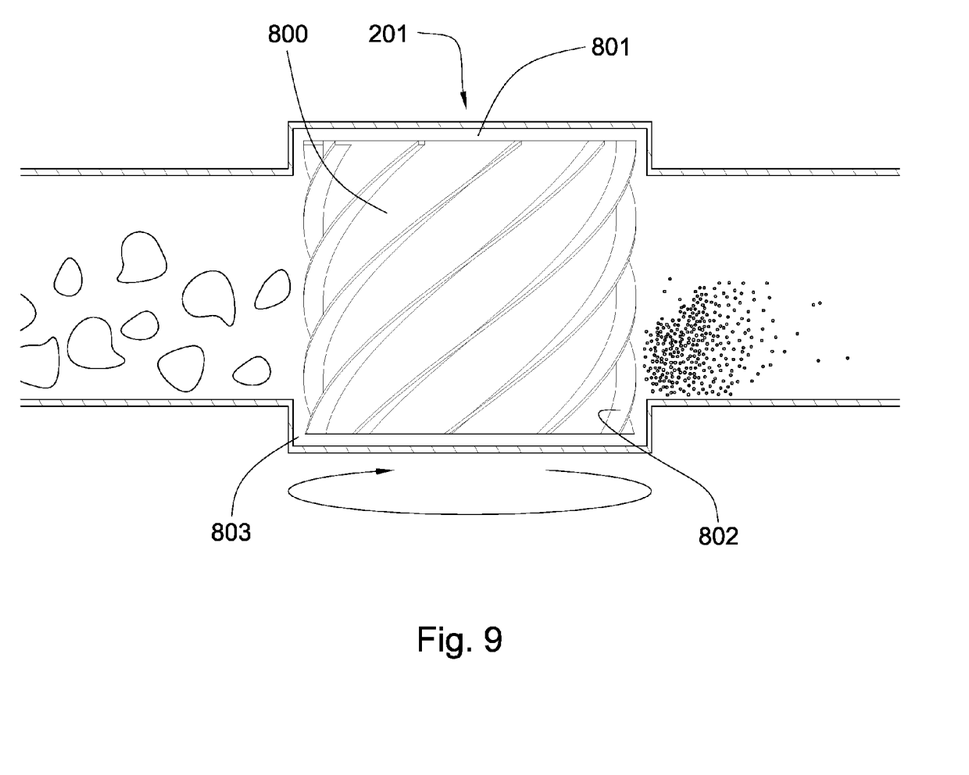
FIG. 9 is a cross-sectional diagram of another embodiment of an in-line agitator.

FIG. 9 is a cross-sectional diagram of another embodiment of an in-line agitator 201. The in-line agitator 201 may be disposed within a housing unit 803. The in-line agitator 201 may comprise a substantially cylindrical body 800. The cylindrical body 800 may comprise at least one protrusion 802 disposed on the outer surface of the cylindrical body 800. The at least one protrusion 802 may be adapted to contact the waste material causing it to break up as it enters the housing unit 803. The cylindrical body 800 may be axially supported by a shaft 801 disposed within the cylindrical body 800.

Whereas the present invention has been described in particular relation to the drawings attached hereto, it should be understood that other and further modifications apart from those shown or suggested herein, may be made within the scope and spirit of the present invention.

What is claimed is:

1. A sewer system, comprising:
    a waste material flow path comprising an entrance and a downstream digester assembly;
    at least one in-line agitator disposed upstream to the digester assembly;
    the at least one inline agitator adapted to break down waste material;
    wherein the at least one in-line agitator is a micronizer.

2. The system of claim 1, wherein the digester assembly comprises a first and second tank; at least one of the tanks being adapted to process waste material through an anaerobic digestion process.

3. The sewer system of claim 2, wherein the first tank is adapted to temporarily store the waste material.

4. The sewer system of claim 2, wherein the digester comprises a connection adapted to provide fluid communication between the first tank and second tank.

5. The sewer system of claim 2, wherein the first tank comprises a settling pool.

6. The sewer system of claim 1, wherein a pump is positioned upstream from the at least one agitator.

7. The sewer system of claim 1, wherein the micronizer comprises a first cylinder with a substantially flat polycrystalline diamond bonded to a face.

8. The sewer system of claim 7, wherein the first cylinder comprises a substantially circular port disposed concentrically with its center.

9. The sewer system of claim 7, wherein the micronizer comprises a second cylinder with a substantially flat polycrystalline diamond bonded to a face.

10. The sewer system of claim 9, wherein the first cylinder is disposed proximate the second cylinder such that when the first cylinder is in contact with the second cylinder, the polycrystalline diamond of the first cylinder contacts the polycrystalline diamond of the second cylinder.

11. The sewer system of claim 1, wherein the micronizer comprises a biasing unit.

12. The sewer system of claim 1, wherein the digester assembly is an anaerobic digester assembly.

13. The sewer system of claim 1, wherein the entrance of the sewer system is in fluid communication with a toilet, sink, washing machine, dishwasher, drain, wastewater receptacle or combinations thereof.

* * * * *